United States Patent [19]

Huggins, Sr. et al.

[11] Patent Number: 5,048,666
[45] Date of Patent: Sep. 17, 1991

[54] NUCLEAR FUEL PELLET TRANSFER ESCALATOR

[75] Inventors: Thomas B. Huggins, Sr., Columbia; Elwyn Roberts, Lugoff; Melvin O. Edmunds, Hopkins, all of S.C.

[73] Assignee: Westinghouse Electric Corp., Pittsburgh, Pa.

[21] Appl. No.: 318,107

[22] Filed: Mar. 2, 1989

[51] Int. Cl.$^5$ ............................................. B65G 47/26
[52] U.S. Cl. ................... 198/431; 198/534; 198/536; 193/27; 193/32
[58] Field of Search ...................... 198/431, 861.3, 534, 198/536, 592; 193/27, 32, 15, 17; 414/140.5, 141.8; 53/247, 248

[56] References Cited

U.S. PATENT DOCUMENTS

| | | | |
|---|---|---|---|
| 2,536,249 | 1/1951 | Archer | 198/431 X |
| 2,540,945 | 2/1951 | Hart | 198/431 X |
| 3,034,626 | 5/1962 | Kay | 193/32 |
| 3,448,847 | 6/1969 | Csimma | 198/72 |
| 4,332,120 | 6/1982 | Haynes et al. | 53/245 |
| 4,566,835 | 1/1986 | Raymond et al. | 414/53 |
| 4,765,453 | 8/1988 | Bucher | 198/431 |
| 4,807,734 | 2/1989 | Breeland, Jr. et al. | 198/534 X |

FOREIGN PATENT DOCUMENTS 0140023 5/1985 European Pat. Off. .
0300246 1/1989 European Pat. Off. .

Primary Examiner—D. Glenn Dayoan

[57] ABSTRACT

A pellet escalator in a pellet loading apparatus for loading nuclear fuel pellets from a pellet press into a sintering boat includes a conveyor in the form of an elongated arm for moving pellets and being pivotable to vertically move its discharge end toward and away from a sintering boat. The arm has an elongated recessed channel through which travels the upper run of an endless flexible conveying belt for transporting pellets from a receiving end to the discharge end of the conveyor. A chute is mounted to the arm at its discharge end and extends therebelow such that the chute is carried by the arm at its discharge end for vertical movement therewith toward and away from the sintering boat. Resiliently-flexible, deflectable bristled brushes are attached to the chute in opposing vertical rows. The brushes in one row are oppositely inclined and vertically offset from brushes in the other row for defining a gravity feed flow path of non-linear configuration between adjacent inner brush ends for transferring pellets downwardly through the chute along the flow path at a drop rate controlled by brush deflections. A stop finger mounted to the arm at its discharge end is actuatable between blocking and unblocking positions in which it respectively stops and permits pellet discharge from the upper run of the belt in the arm channel.

9 Claims, 4 Drawing Sheets

NUCLEAR FUEL PELLET TRANSFER ESCALATOR

BACKGROUND OF THE INVENTION

1. Field of the Invention

The present invention relates generally to handling nuclear fuel pellets and, more particularly, is concerned with a nuclear fuel pellet escalator for transferring pellets from a rotary pellet press into a sintering boat.

2. Description of the Prior Art

An operational step in the nuclear fuel fabrication process is the loading of green nuclear fuel pellets, which have been ejected from the pellet press, into sintering containers, or "boats", in preparation for high-temperature firing of the pellets in a sintering furnace. This operation requires careful handling of the pellets, because the pellets at this time are fragile and susceptible to damage.

One approach in the prior art to loading nuclear fuel pellets into a sintering boat is by gravity discharge from the pellet press down a chute into the boat. This approach has the disadvantage of allowing significant amount of pellet-to-pellet impacts, providing considerable potential for pellet damage. Another approach in the prior art is to employ mechanical blades or jaws to pick up a single row of nuclear fuel pellets at a time and transfer that row into the sintering boat. Still another prior art approach is to utilize a vacuum transfer head which lowers onto an array of nuclear fuel pellets, applies a vacuum to lift the pellets, and transfers the array to load a complete layer of pellets into the sintering boat at one time.

Two other approaches for loading nuclear fuel pellets into sintering boats from a pellet press are disclosed in U.S. Pat. No. 4,332,120 to Haynes et al and U.S. Pat. No. 4,566,835 to Raymond et al assigned to the assignee of the present invention. In the Haynes et al patent, a loading mechanism is disclosed which includes a rotating table on the pellet press that carries nuclear pellets from the press, a stationary ejector arm which cams pellets from the rotating table, a rotating turntable located adjacent the rotating press table which receives the pellets cammed therefrom, and another ejector arm or camming bar that cams pellets off the rotating turntable and over an opening through which the pellets can fall into a vertical chute located above a sintering boat. The vertical chute has a plurality of oppositely downwardly-angled resiliently-covered plates defining a zig-zag path downward through the chute for directing pellets downwardly by gravity from the rotating turntable at the higher elevation to the sintering boat at the lower elevation. The zig-zag configuration of the path serves to limit the accumulation of momentum by the pellets as they fall to the sintering boat. A platform supporting the boat is spring-biased against the accumulated weight of the pellets and boat so as to continuously lower as the weight of the pellets deposited in the boat increases.

In the Raymond et al patent, a loading system is disclosed which includes a second rotating transfer turntable that receives pellets ejected from a first rotating turntable of a pellet press by a first stationary wiper arm, a transfer conveyor which receives pellets guided off the second transfer turntable by a second stationary wiper arm, and a rotatable drum which receives pellets in a row thereof from the transfer conveyor and transfers them to one of a pair of sintering boats positioned on sliding tables on either side of the drum. The transfer drum is rotatable about a horizontal axis and has three longitudinally extending channels being circumferentially spaced from one another 120 degrees. Each channel is sized to receive a row of standing pellets when at an upward vertical loading position. The drum can be rotated and counterrotated to change the position of a given channel from the upward vertical loading position to a below-horizontal unloading position and back around to the upward loading position. Each channel has a bottom bar which can be moved by an actuator to eject the row of pellets when the channel is at the below-horizontal unloading position and aligned with an incline member leading to one of the boats.

The above-described approaches of Haynes et al and Raymond et al appear to constitute steps in the right direction. However, these approaches still fall short of providing the degree of control over handling of green nuclear fuel pellets that is desired. Consequently, further improvements are still needed in the loading of green nuclear fuel pellets.

SUMMARY OF THE INVENTION

The present invention provides a nuclear fuel pellet transfer escalator designed to satisfy the aforementioned needs. The pellet escalator, for loading nuclear fuel pellets into a sintering boat, basically comprises: (a) a generally horizontally-disposed, vertically-swingable pellet transfer conveyor for moving pellets from a receiving end to a discharge end thereof; and (b) a pellet dispensing chute mounted to the conveyor at the discharge end thereof and extending therebelow such that the chute is carried at the discharge end of the conveyor for movement therewith toward and away from the sintering boat. The conveyor is mounted about an axis at its receiving end to an upright support structure for pivotal movement to generally vertically move its discharge end and the dispensing chute toward and away from a sintering boat when placed below the chute and conveyor discharge end.

The pellet escalator also includes deflectable pellet handling and guiding means attached to the chute for defining a gravity feed flow path of a non-linear configuration through the chute from the conveyor discharge end that permits pellets to move downwardly along the path through the chute to the sintering boat without accumulating such momentum as would produce impact damage upon reaching the boat. More particularly, the deflectable pellet handling and guiding means is in the form of a plurality of resiliently-flexible, deflectable bristled brushes attached to the chute and arranged in a pair of opposing vertical rows which define the flow path therebetween. Further, the chute includes a pair of spaced brush holder structures for supporting the rows of brushes. The brushes in one row are oppositely inclined and vertically offset from the brushes in the other row for defining the flow path between adjacent inner ends of the brushes in the pair of opposing rows for transferring pellets at a drop rate controlled by brush deflections.

Further, the conveyor of the pellet escalator includes an elongated arm swingable vertically about the conveyor axis and having an elongated channel recessed below an upper side of the arm and extending between the receiving and discharge ends of the conveyor. The conveyor further includes an endless flexible pellet supporting and conveying belt movably mounted to the arm and having an upper run disposed for movement along the channel for receiving pellets at the receiving end of the conveyor and carrying pellets to the discharge end thereof.

The pellet escalator also includes a stop element mounted to the arm at the discharge end of the conveyor and being actuatable between blocking and unblocking positions in which it respectively stops and permits the discharge of pellets from the arm channel and the conveying belt at the discharge end of the conveyor. More particularly, the stop element is an elongated finger pivotable between the blocking position in which it projects into channel across the path of the pellets and the unblocking position in which it is withdrawn from the channel.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
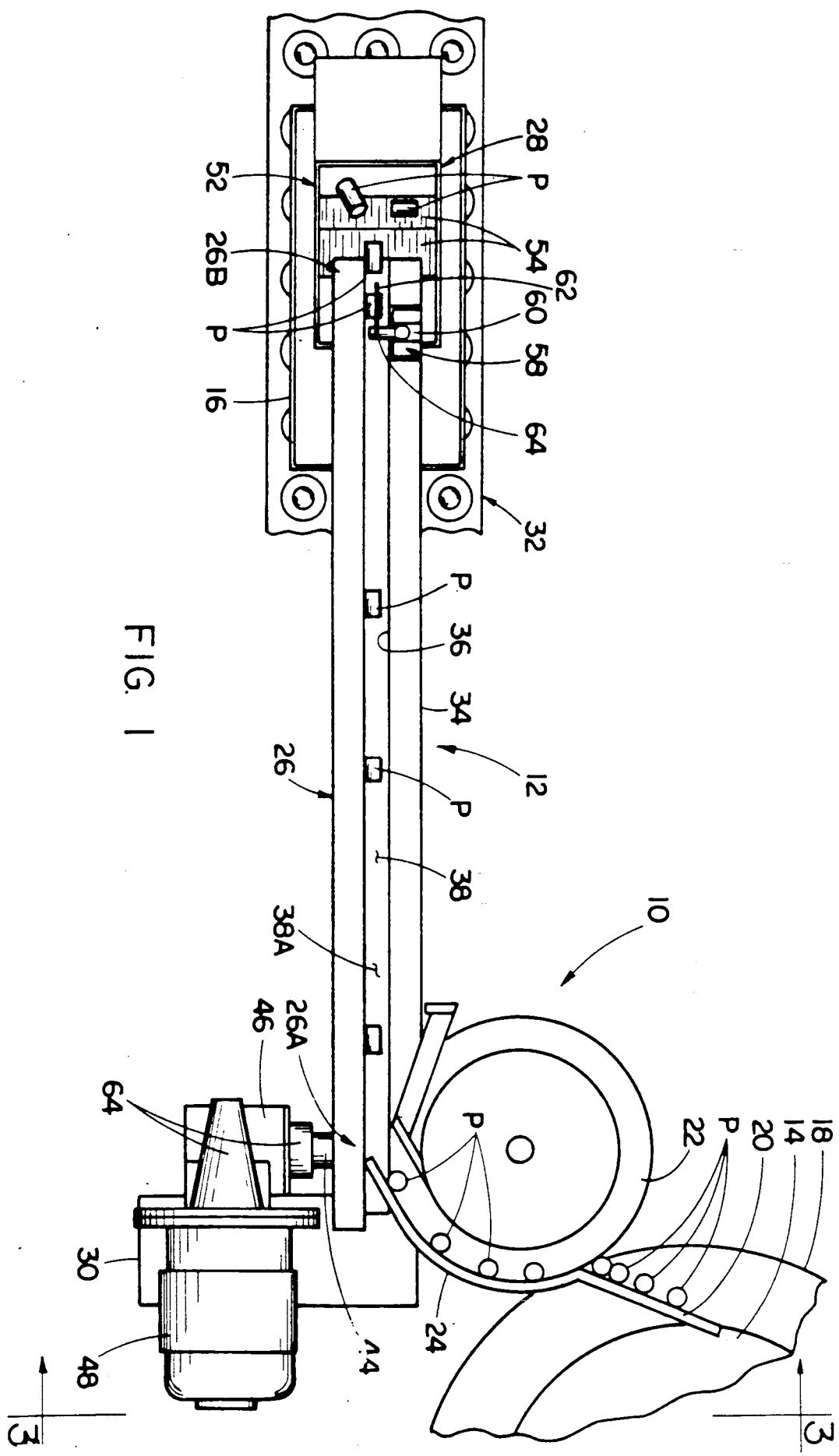
FIG. 1 is a top plan view of a nuclear fuel pellet loading apparatus employing a pellet transfer escalator in accordance with the present invention.

In the following description, like reference characters designate like or corresponding parts throughout the several views of the drawings. Also in the following description, it is to be understood that such terms as "forward", "rearward", "left", "right", "upwardly", "downwardly", and the like, are words of convenience and are not to be construed as limiting terms.

In General

Figure 2:
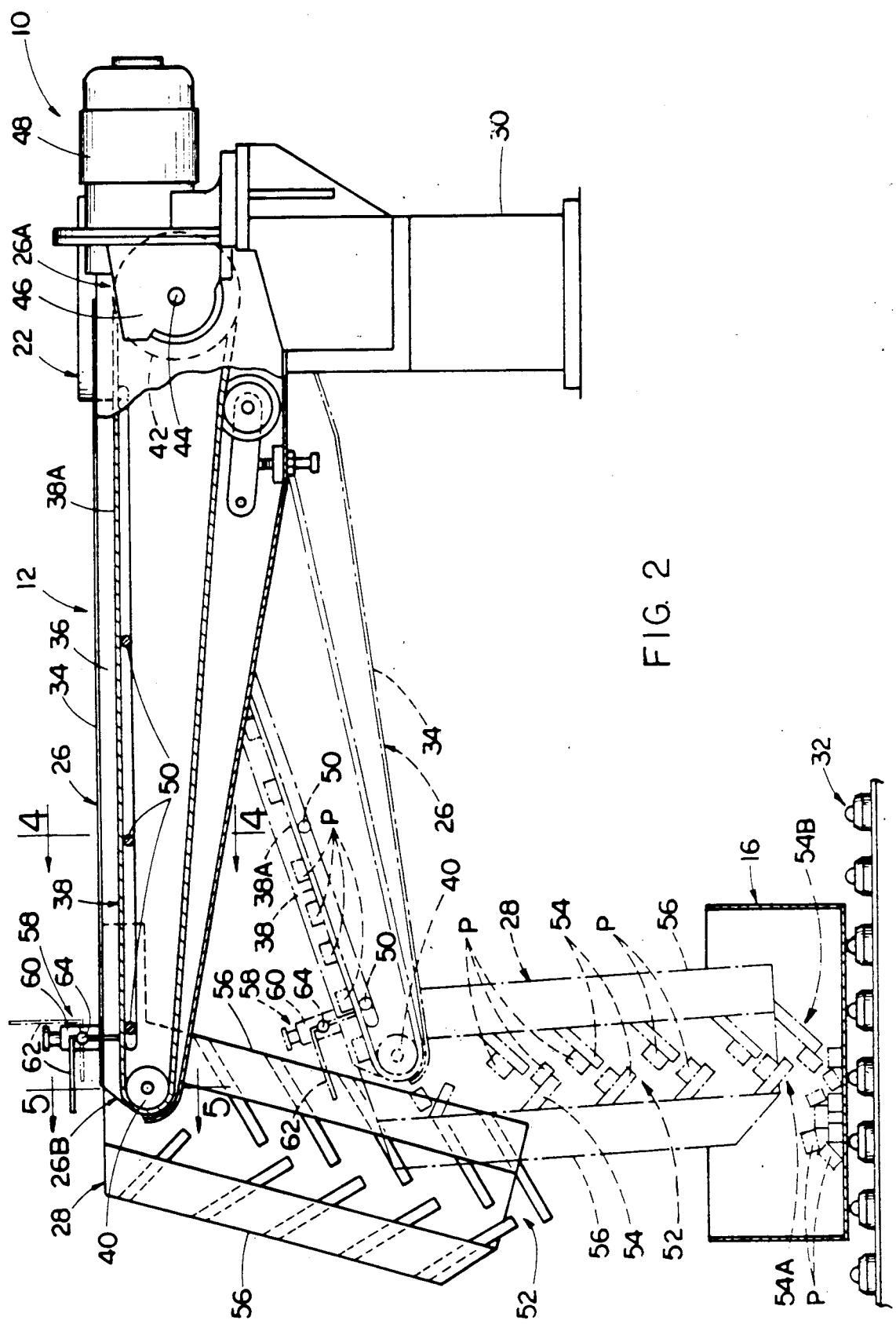
FIG. 2 is a side elevational view of the pellet loading apparatus of FIG. 1, illustrating the extreme upper position, in full line form, and the extreme lower position, in dashed line form, of the pellet transfer escalator.

Referring now to the drawings, and particularly to FIGS. 1 and 2, there is illustrated a pellet loading apparatus, generally designated 10, employing a pellet transfer escalator 12 of the present invention for transferring nuclear fuel pellets P from a rotary pellet press 14 into a sintering boat 16. In addition to the pellet transfer escalator 12 of the present invention, as generally used in the prior art the loading apparatus 10 includes a horizontal table 18 on the pellet press 14 that rotates about a vertical axis and carries pellets P from the press 14, and a stationary ejector arm 20 mounted above the rotating table 18 at an angle for camming pellets P from the rotating table 18. The loading apparatus 10 also includes a horizontal transfer disk 22 that rotates about a vertical axis and is located adjacent the rotating press table 18 for receiving the pellets P cammed therefrom, and another ejector arm 24 that cams pellets P off the rotating disk 22 to the pellet transfer escalator 12. With the exception of the pellet transfer escalator 12 of the present invention, the above-described parts of the pellet loading apparatus 10 and their cooperative arrangement are generally similar to those of the apparatuses disclosed in the two above-cited U.S. patents.

Pellet Transfer Escalator of the Present Invention

While still referring to FIGS. 1 and 2, there is also illustrated the pellet transfer escalator 12 of the present invention for loading nuclear fuel pellets P into the sintering boat 16 from the rotating transfer disk 22. In its basic components, the pellet escalator 12 includes a generally horizontally-disposed, vertically-swingable pellet transfer conveyor 26 for moving pellets, preferably in single file fashion, from a receiving end 26A to a discharge end 26B of the conveyor 26, and a pellet dispensing chute 28 mounted to the conveyor 26 at its discharge end 26B and extending therebelow such that the chute 28 is carried at the conveyor discharge end 26B for generally vertical movement therewith (between the extreme upper and lower positions shown in FIG. 2) toward and away from the sintering boat 16.

More particularly, the pellet transfer conveyor 26 is mounted about a horizontal axis at its receiving end 26A to a stationary upright support structure 30 for pivotal movement to generally vertically move its discharge end 26B and the chute 28 therewith toward and away from the sintering boat 16. Also, the dispensing chute 28 has an upper end disposed for receiving pellets P from the transfer conveyor 26 at its discharge end 26B and a lower end disposable within the sintering boat 16, by vertical pivoting of the transfer conveyor 26, for depositing pellets P in the boat 16. Preferably, the boat 16 is positioned on a roller bearing boat conveyor 32 located generally at floor level below the chute 28 and conveyor discharge end 26B, as best seen in FIG. 2.

Figure 4:
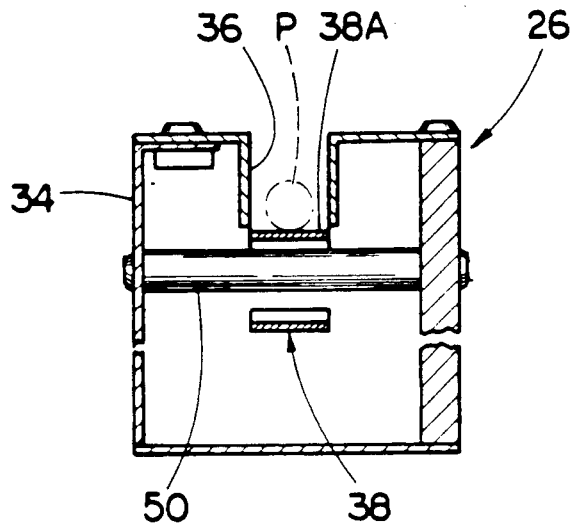
FIG. 4 is an enlarged cross-sectional view of the pellet transfer escalator of the loading apparatus taken along line 4—4 of FIG. 2.
Figure 5:
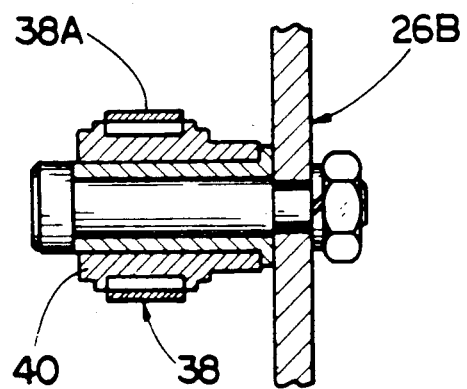
FIG. 5 is another enlarged cross-sectional view of the pellet transfer escalator of the loading apparatus taken along line 5—5 of FIG. 2.

Also, the transfer conveyor 26 of the pellet escalator 12 includes an elongated arm 34 swingable vertically about the horizontal pivot axis of the conveyor 26. As seen in FIG. 1, 2 and 4, the arm 34 is composed of an assembly of long narrow plates connected together to provide a hollow construction and define an elongated channel 36 recessed below an upper side of the arm 34 and extending between the receiving and discharge ends 26A, 26B of the conveyor 26. Preferably, the channel 36 in the arm 34 has a width slightly larger than the diameter of the pellet P, as shown in dashed outline form in FIG. 4.

Figure 3:
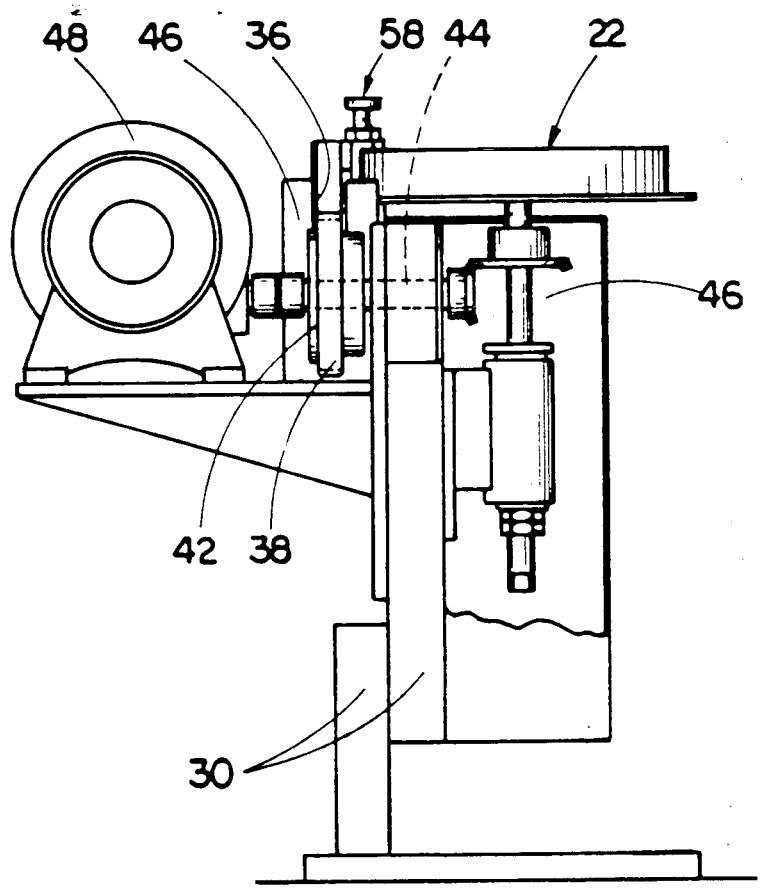
FIG. 3 is an end elevational view of the pellet loading apparatus as seen along line 3—3 of FIG. 1.

As also seen in FIGS. 1, 2, 4 and 5, the transfer conveyor 26 further includes an endless flexible pellet supporting and conveying belt 38 movably mounted by idler and drive pulleys 40, 42. The idler pulley 40 (FIG. 5) is rotatably mounted to the arm 34 at the discharge end 26B of the conveyor 26, whereas the drive pulley 42 (FIGS. 2 and 3) is attached to an output shaft 44 of a gear box 46 drivingly coupled to a drive motor 48 mounted on the support structure 30. The transfer disk 22 that feeds pellets P to the conveying belt 38 is also driven off the same gear box 46 and motor 48 as the drive pulley 42 such that the speeds of the belt 38 and disk 22 are coordinated for smooth transfer of pellets from the disk to the belt.

The conveying belt 38 of the transfer conveyor 26 provides a continuous pellet-supporting outer surface and has an upper horizontal run 38A supported by spaced guide bars 50 mounted to and extending across the interior of the arm 34 and bottom of the channel 36, disposing the upper belt run 38A for movement along the bottom of the recessed channel 36. The upper belt run 38A receives pellets P one at a time (preferably standing on end, although they can also be received lying down lengthwise) at the receiving end 26A of the conveyor 26 and carries the pellets in single file to the discharge end 26B thereof. The rotating transfer disk 22 transports pellets to a point where the conveyor arm 34 is tangent to the disk 22 which point is located proximate the receiving end 26A of the conveyor 26 where it is pivotally mounted about the stationary horizontal axis. A friction clutch (not shown) or similar mechanism is incorporated by the conveyor arm 34 to hold the arm 34 at any position to which it has been manually swung by an operator. This allows the discharge end 26B of the conveyor 26 and the chute 28 to be positioned at any vertical location within the arc of movement of the arm 34 and to remain there.

Further, the pellet escalator 12 includes deflectable pellet handling and guiding means 52 attached to the dispensing chute 28 for defining a gravity feed flow path of a non-linear configuration through the chute 28 from the conveyor discharge end 26B that permits pellets P to move downwardly along the path through the chute 28 to the sintering boat 16 without accelerating and accumulating such momentum as would produce impact damage upon reaching the boat 16. More particularly, the deflectable pellet handling and guiding means 52 is in the form of a plurality of resiliently-flexible, deflectable bristled brushes 54, preferably of nylon material, attached to the chute 28 and arranged in a pair of opposing vertical rows 54A, 54B which define the flow path therebetween. The dispensing chute 28 is generally of rectangular hollow box-shaped configuration and includes a pair of oppositely-disposed and spaced brush holder structures 56 for supporting the rows of brushes 54. The holder structures 56 support the rows of brushes 54 such that the brushes 54 in each one row 54A, 54B have their inner ends disposed substantially in alignment with one another vertically and are spaced apart out of contact with one another. Further, the brushes 54 in each one row 54A, 54B are oppositely inclined and vertically offset from the brushes 54 in the other row 54B for defining the flow path between adjacent inner ends of the brushes in the pair of opposing rows 54A, 54B for transferring pellets P at a drop rate controlled by brush deflections.

Finally, the pellet escalator 12 includes a stop element 58 mounted to the conveyor arm 34 at the discharge end 26B of the conveyor 26. The stop element 58 is capable of actuation between blocking and unblocking positions in which it respectively stops and permits the discharge of pellets P from the arm channel 36 and the conveying belt 38 at the discharge end 26B of the conveyor 26 into the upper end of the dispensing chute 28. More particularly, the stop element 58 includes a bracket 60 and a L-shaped finger 62 mounted to a shaft 64 rotatably mounted to the bracket 60. The finger 62 can be gripped by the operator for moving it between the blocking position shown in solid line form in FIG. 2 in which it projects into channel 36 across the path of the pellets and the unblocking position shown in dashed line form in which it is withdrawn from the channel 36. When the finger 62 is in the blocking position, a detent (not shown) in the bracket 60 holds it there such that the pellets P are stopped by contact of the finger 62 with the leading pellet and also contact of the pellets with one another in their single file row on the belt 38. The belt 38 continues to move, slipping relative to the pellets P supported thereon. The finger 62 is placed in the blocking position to prevent dispensing of pellets when the operator is replacing a full sintering boat 16 with an empty one.

It should be noted that the roller bearing boat conveyor 32 facilitates moving the boat 16 relative to the chute 28 so that even filling of the boat with pellets can be easily achieved. At start of boat filling, the operator manually swings the conveyor arm 34 downward to lower the discharge end 26B of the conveyor and the dispensing chute 28 toward the boat 16 until the chute 28 extends into the boat as illustrated in dashed line form in FIG. 2. As the boat 16 begins to fill with pellets, the boat is moved laterally as required for even filling and the arm 34 and chute 28 are raised gradually. While movement of the arm is disclosed as manually performed by the operator, it can also be automated. When the boat is filled, the operator positions an empty boat beside the filled boat and then flips the pellet stop finger 62 from the unblocking to blocking position into the path of the stream of pellets on the belt 38. The arm 34 and chute 28 are raised enough to clear the filled boat, allowing its removal and replacement by an empty boat under the chute. The arm 34 is pivoted, lowering the chute 28 into the empty boat. The finger 62 is flipped back to its unblocking position and pellet loading resumes.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. A nuclear fuel pellet escalator for loading nuclear fuel pellets into a sintering boat, comprising:
   (a) a generally horizontally-disposed pellet transfer conveyor for moving pellets in single file fashion from a receiving end to a discharge end thereof, said conveyor being mounted about an axis at its receiving end for pivotal movement to generally vertically move its discharge end toward and away from a sintering boat when placed below said discharge end of said conveyor, said conveyor including an elongated arm swingable vertically about said axis and having an elongated channel recessed below an upper side of said arm and extending between said receiving and discharge ends of said conveyor;
   (b) a pellet dispensing chute mounted to said arm of said conveyor at said discharge end thereof and extending therebelow such that said chute is carried at said discharge end of said conveyor for generally vertical movement therewith toward and away from the sintering boat;
   (c) deflectable pellet handling and guiding means attached to said chute for defining a gravity feed flow path of a non-linear configuration through said chute from said conveyor discharge end that permits pellets to move downwardly along said path through said chute to the sintering boat without accumulating such momentum as would produce impact damage upon reaching the boat;

(d) said deflectable pellet handling and guiding means including a plurality of resiliently-flexible, deflectable bristled brushes and a pair of spaced brush holder structures for supporting said brushes in a pair of opposing vertical rows thereof which define said flow path therebetween with said brushes in each one row being spaced vertically out of contact with one another and having their inner ends substantially aligned vertically, said brushes in each one row also being oppositely inclined downwardly toward said brushes in the other row and vertically offset from said brushes in the other row for defining said flow path between adjacent inner ends of said brushes in said pair of opposing rows for transferring pellets at a drop rate controlled by brush deflections; and (e) a stop element mounted at said discharge end of said conveyor and being actuatable between blocking and unblocking positions in which it respectively stops and permits the discharge of pellets from said discharge end of said conveyor.

2. The pellet escalator as recited in claim 1, wherein said channel in said arm has a width slightly larger than the diameter of a nuclear fuel pellet.

3. The pellet escalator as recited in claim 1, wherein said conveyor further includes:

an endless flexible pellet supporting and conveying belt having a continuous pellet-supporting outer surface and movably mounted by said arm, said belt having an upper run disposed along said channel for receiving pellets at said receiving end of said conveyor and carrying the pellets to said discharge end thereof.

4. The pellet escalator as recited in claim 1, wherein said stop element is an elongated finger pivotable between said blocking position in which it projects into said channel across the path of the pellets and said unblocking position in which it is withdrawn from said channel.

5. A nuclear fuel pellet escalator for loading nuclear fuel pellets into a sintering boat, comprising:

(a) an upright stationary support structure;

(b) an elongated conveyor for moving pellets in single file fashion from a receiving end to a discharge end thereof, said conveyor being mounted at its receiving end to said support structure for pivotal movement relative thereto to vertically move its discharge end toward and away from a sintering boat when placed below said discharge end of said conveyor;

(c) said conveyor including an elongated arm swingable vertically about said axis and having an elongated channel recessed below an upper side of said arm and extending between said receiving and discharge ends of said conveyor, and an endless flexible pellet supporting and conveying belt with a continuous outer surface movably mounted to said arm and having an upper run disposed along said channel for receiving pellets at said receiving end of said conveyor and carrying the pellets in said single file fashion to said discharge end thereof;

(d) a chute mounted to said arm of said conveyor at said discharge end thereof and extending therebelow such that said chute is carried by said arm at said discharge end of said conveyor for generally vertical movement therewith toward and away from the sintering boat, said chute having an upper end disposed for receiving pellets from said conveyor belt at said discharge end of said conveyor and a lower end disposable within the sintering boat, by pivoting of said conveyor, for depositing pellets in the boat;

(e) a stop element mounted to said arm at said discharge end of said conveyor and being actuatable between blocking and unblocking positions in which it respectively stops and permits the discharge of pellets from said upper run of said belt in said channel of said arm at said discharge end of said conveyor; and (f) deflectable pellet handling and guiding means attached to said chute for defining a gravity feed flow path of a non-linear configuration through said chute from said conveyor discharge end that permits pellets to move downwardly along said path through said chute to the sintering boat without accumulating such momentum as would produce impact damage upon reaching the boat;

(g) said deflectable pellet handling and guiding means including a plurality of resilient-flexible, deflectable bristled brushes and a pair of spaced brush holder structures for supporting said brushes in a pair of opposing vertical rows thereof which define said flow path therebetween with said brushes in each one row being spaced vertically out of contact with one another and having their inner ends substantially aligned vertically, said brushes in each one row also being oppositely inclined downwardly toward said brushes in the other row and vertically offset from said brushes in the other row for defining said flow path between adjacent inner ends of said brushes in said pair of opposing rows for transferring pellets at a drop rate controlled by brush deflections.

6. The pellet escalator as recited in claim 5, wherein said channel in said arm has a width slightly larger than the diameter of a nuclear fuel pellet.

7. The pellet escalator as recited in claim 5, wherein said stop element is an elongated finger pivotable between said blocking position in which it projects into said channel and unblocking positions in which it is withdrawn from said channel.

8. A method of transferring nuclear fuel pellets from a rotary pellet press and loading the pellets into a sintering boat, comprising the steps of:

(a) transferring nuclear fuel pellets in single file path from a rotary pellet press to a location above a sintering boat by moving an endless belt of a conveyor while the pellets rest on a continuous outer surface of the belt;

(b) dispensing the pellets downwardly from a discharge end of the belt along a gravity feed flow path of a non-linear configuration through a chute at the discharge end of the conveyor to the sintering boat without the pellets accumulating such momentum as would produce impact damage upon reaching the boat; and (c) selectively blocking the single file path of the pellets at the discharge end of the belt causing the pellets to slip on the outer surface of the belt as the belt continuous to move in order to temporarily interrupt pellet loading into the sintering boat;

(d) said dispensing includes dropping the pellets from the discharge end of the moving belt between a pair of opposing rows of resilient-flexible, deflectable bristled brushes which define at their inner ends the non-linear flow path therebetween with said brushes in each one row being spaced vertically out of contact with each other and having their inner ends substantially aligned vertically, said brushes in each one row also being oppositely inclined downwardly toward said brushes in the other row and vertically offset from said brushes in the other row to cause descent of the pellets at a drop rate controlled by brush bristle deflections.

9. The nuclear pellet transferring and loading method as recited in claim 8, further comprising the step of swingably moving the conveyor to vertically move the chute away from the sintering boat as the level of pellets rises in the boat.

* * * * *